(12) United States Patent
Nakayama et al.

(10) Patent No.: US 10,622,605 B2
(45) Date of Patent: Apr. 14, 2020

(54) EXTERNAL CONNECTION BUS BAR HOLDING STRUCTURE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Osamu Nakayama, Mie (JP); Naoki Fukushima, Mie (JP); Katsushi Miyazaki, Mie (JP); Seishi Kimura, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/077,243

(22) PCT Filed: Mar. 13, 2017

(86) PCT No.: PCT/JP2017/009863
§ 371 (c)(1),
(2) Date: Aug. 10, 2018

(87) PCT Pub. No.: WO2017/163950
PCT Pub. Date: Sep. 28, 2017

(65) Prior Publication Data
US 2019/0051873 A1 Feb. 14, 2019

(30) Foreign Application Priority Data
Mar. 25, 2016 (JP) .................................. 2016-061548

(51) Int. Cl.
*B60R 16/033* (2006.01)
*H01M 2/10* (2006.01)
(Continued)

(52) U.S. Cl.
CPC .......... *H01M 2/1077* (2013.01); *B60L 50/64* (2019.02); *B60R 16/033* (2013.01); *H01M 2/206* (2013.01);
(Continued)

(58) Field of Classification Search
None
See application file for complete search history.

(56) References Cited

U.S. PATENT DOCUMENTS 5,804,770 A * 9/1998 Tanaka .................. H01M 2/206
174/138 F
9,960,401 B2 5/2018 Takase et al.
(Continued)

FOREIGN PATENT DOCUMENTS

JP 2013-114951 6/2013
JP 2014-078371 5/2014
(Continued)

OTHER PUBLICATIONS

Official Communication issued in International Bureau of WIPO Patent Application No. PCT/JP2017/009863, dated May 30, 2017.

*Primary Examiner* — Haroon S. Sheikh
(74) *Attorney, Agent, or Firm* — Greenblum & Bernstein, P.L.C.

(57) ABSTRACT

An external connection bus bar holding structure includes: a first protector that holds one end portion of an external connection bus bar; a second protector that is arranged at an interval from the first protector and holds the other end portion of the external connection bus bar; and an intermediate protector including a first held portion that is held in the first protector and a second held portion that is held in the second protector. The intermediate protector holds the exter- (Continued)

nal connection bus bar at the first held portion and the second held portion and between the first protector and the second protector.

10 Claims, 10 Drawing Sheets

(51) Int. Cl.
    *H01M 2/20*     (2006.01)
    *H01M 2/30*     (2006.01)
    *H01R 4/58*     (2006.01)
    *B60L 50/64*     (2019.01)
    *H01M 2/04*     (2006.01)

(52) U.S. Cl.
    CPC .............. *H01M 2/305* (2013.01); *H01R 4/58* (2013.01); *H01M 2/043* (2013.01); *H01M 2220/20* (2013.01)

(56) References Cited

U.S. PATENT DOCUMENTS

| | | |
|---|---|---|
| 2014/0322982 A1 | 10/2014 | Nakayama |
| 2015/0070025 A1 | 3/2015 | Nakayama et al. |
| 2016/0197330 A1 | 7/2016 | Takase et al. |
| 2017/0288199 A1 | 10/2017 | Nakayama et al. |

FOREIGN PATENT DOCUMENTS

| | | |
|---|---|---|
| JP | 2014-127229 | 7/2014 |
| JP | 2015-056351 | 3/2015 |
| WO | 2013/021538 | 2/2013 |
| WO | 2013/084713 | 6/2013 |
| WO | 2014/002682 | 1/2014 |
| WO | 2016/035572 | 3/2016 |

\* cited by examiner

EXTERNAL CONNECTION BUS BAR HOLDING STRUCTURE

TECHNICAL FIELD

The technique disclosed in the present specification relates to an external connection bus bar holding structure, and specifically relates to a structure for holding an external connection bus bar that is connected to at least one of a pair of output electrode terminals in a power storage element group composed of multiple power storage elements.

BACKGROUND ART

Conventionally, an external connection bus bar disclosed in Patent Document 1 has been known as an example of an external connection bus bar that is connected to output electrode terminals of a power storage element group. Patent Document 1 discloses external connection bus bars 19B that are connected to electrode terminals of power storage elements on both ends of a power storage element group, in a battery module (power storage module) M1 with a configuration in which a pair of output electrode terminals are the electrode terminals of the power storage elements on both ends. In view of this, the external connection bus bars 19B are held by resin protectors (insulating protectors) 20 along with bus bars 19 that connect the electrode terminals of the power storage elements.

CITATION LIST

Patent Documents

Patent Document 1: JP 2014-127229A

SUMMARY OF INVENTION

Technical Problem

However, if the arrangement of the power storage element group is the same as in the above-described Patent Document 1, the pair of output electrode terminals are the electrode terminals of the power storage elements on the same end of the power storage element group. In this case, the external connection bus bar to be connected to one of the pair of output electrode terminals needs to be disposed over a long distance to the other end of the power storage element group. For this reason, a technique is desired in which the outer connection bus bar disposed over the long distance is held easily and stably.

The technique disclosed in the present specification has been completed based on the above-described circumstances, and provides an external connection bus bar holding structure that can, with a simple configuration, stably hold an external connection bus bar disposed over a long distance.

Solution to the Problem

An external connection bus bar holding structure disclosed in the present specification is an external connection bus bar holding structure for an external connection bus bar to be connected to a power storage element group that is composed of a plurality of power storage elements and has a pair of output electrode terminals for outputting power to an exterior, wherein the external connection bus bar has a thin plate shape and includes one end portion configured to be connected to at least one of the pair of output electrode terminals and another end portion configured to be connected to an external device, and the holding structure includes: a first protector that holds the one end portion of the external connection bus bar; a second protector that is arranged at an interval from the first protector and holds the other end portion of the external connection bus bar; and an intermediate protector including a first held portion that is held in the first protector and a second held portion that is held in the second protector, the intermediate protector holding the external connection bus bar at the first held portion and the second held portion and between the first protector and the second protector.

According to this configuration, in addition to the first protector and the second protector, an intermediate protector that includes the first held portion that is held overlapping with the first protector and the second held portion that is held overlapping with the second protector is provided as a protector that holds the external connection bus bar. For this reason, even if the external connection bus bar needs to be disposed over a long distance between both ends of the power storage element group, the external connection bus bar can be held easily and stably. Also, since a thin plate-shaped external connection bus bar can be held in the first protector and the second protector while being held in the intermediate protector, deformation of the external connection bus bar can be suppressed and the external connection bus bar can be attached to the first protector and the second protector. Furthermore, in the first held portion and the second held portion, which are coupling portions for the multiple protectors, it is possible to suppress a case in which the thin plate-shaped external connection bus bar deforms. For this reason, according to the external connection bus bar holding structure of this configuration, the external connection bus bar disposed over a long distance can be held stably with a simple configuration.

With the above-described external connection bus bar holding structure, the intermediate protector may have a shape that covers a lower surface, both side surfaces extending in a lengthwise direction, and both end surfaces extending in the lengthwise direction on an upper surface, of the external connection bus bar, the first protector may have a first locking portion that locks the external connection bus bar via the first held portion of the intermediate protector, and the second protector may have a second locking portion that locks the external connection bus bar via the second held portion of the intermediate protector.

According to this configuration, the external connection bus bar can be held more stably using the configuration of the intermediate protector in which the external bus bar is held so as to be covered, and the configurations of the first locking portion and the second locking portion.

Also, with the above-described external connection bus bar holding structure, the intermediate protector may be constituted by synthetic resin that elastically deforms.

According to this configuration, the task of attaching the external connection bus bar to the intermediate protector can be simplified.

Also, with the above-described external connection bus bar holding structure, the intermediate protector may have a bottom portion with which the lower surface of the external connection bus bar comes into contact, and at least two protrusions that extend in the lengthwise direction of the intermediate protector may be formed on a surface of the bottom portion opposite to the surface that comes into contact with the lower surface of the external connection bus bar.

According to this configuration, the rigidity of the intermediate protector can be increased using the configuration of the protrusion.

Also, with the above-described external connection bus bar holding structure, the intermediate protector may have a bottom portion with which the lower surface of the external connection bus bar comes into contact, and both end portions in a width direction of the bottom portion may be formed as thin portions that do not come into contact with the lower surface of the external connection bus bar.

According to this configuration, the intermediate protector deforms more easily due to the thin portion, even if the material of the intermediate protector is a hard synthetic resin material. For this reason, the task of attaching the external connection bus bar to the intermediate protector can be simplified.

Advantageous Effects of the Invention

With the external connection bus bar holding structure disclosed in the present application, the external connection bus bar disposed over a long distance can be held stably with a simple configuration.

DESCRIPTION OF EMBODIMENTS

Figure 3:
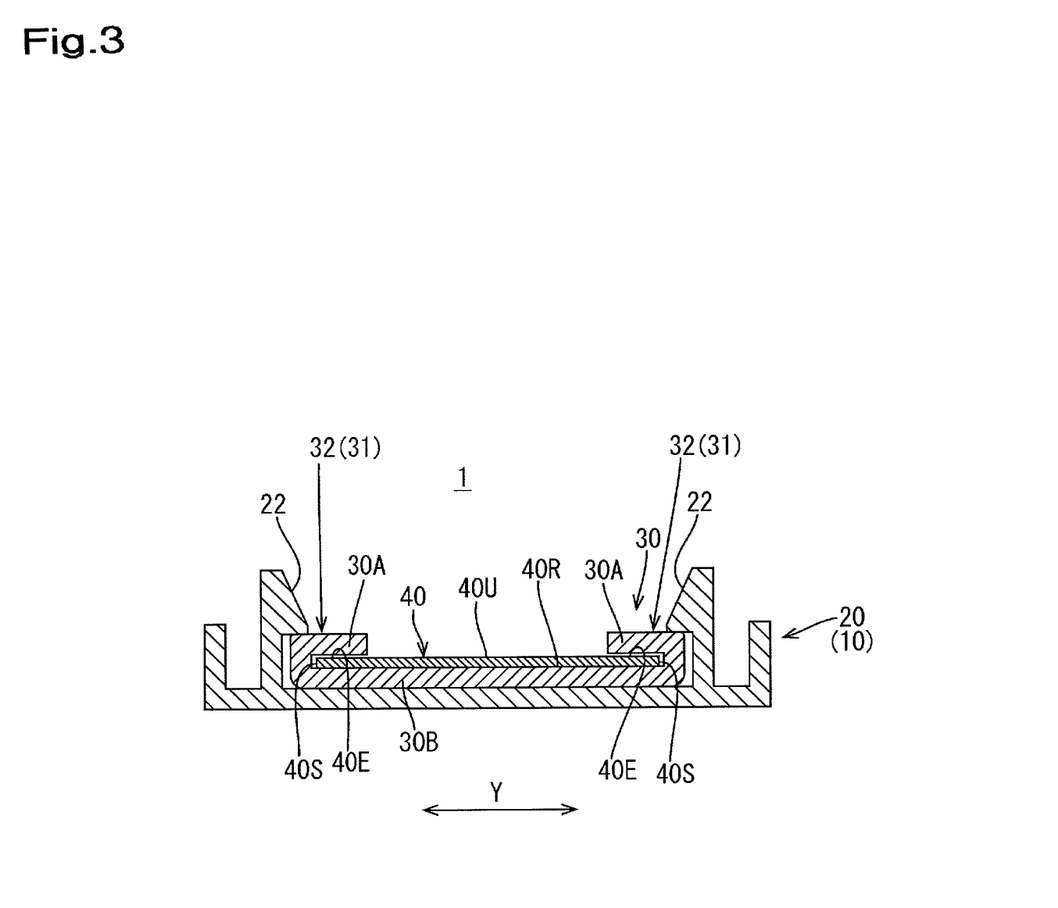
FIG. 3 is a partial cross-sectional view of an external connection bus bar holding structure.

An embodiment will be described with reference to FIGS. 1 to 8. Note that FIG. 3 is a cross-sectional view taken along line A-A in FIG. 1. The power storage module 100 shown in the present embodiment is mounted in a vehicle (not shown) such as an electric automobile or a hybrid automobile, and is used as a power source for driving the vehicle. Also, an external connection bus bar holding structure 1 shown in the present embodiment is attached to the upper portion of the power storage module 100 (see FIG. 4). Note that in the following description, description will be given using the direction indicated by arrow X in FIGS. 1 and 4 as the left side and the direction indicated by arrow Y in FIG. 5 as upward. Also, regarding multiple identical members, in some cases, one member is denoted by a reference sign and the other members are not.

1. Configuration of Anode External Connection Bus Bar (External Connection Bus Bar)

Figure 4:
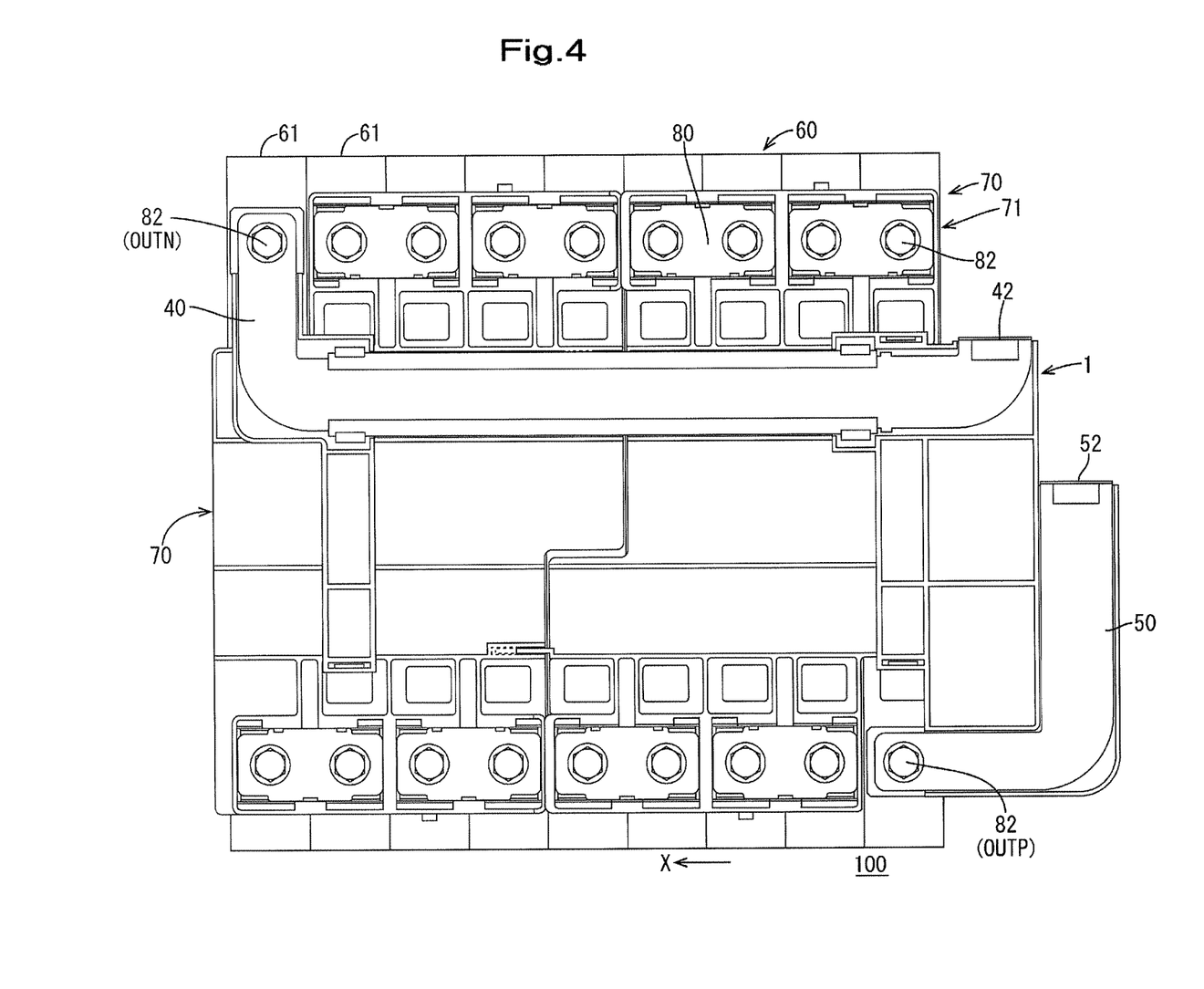
FIG. 4 is a plan view of a power storage module.

An anode external connection bus bar 40 according to the present embodiment is connected to an anode output terminal OUTN of a pair of output terminals (OUTP, OUTN) for outputting power to an external device, of the power storage element group 60 (see FIG. 4).

Figure 1:
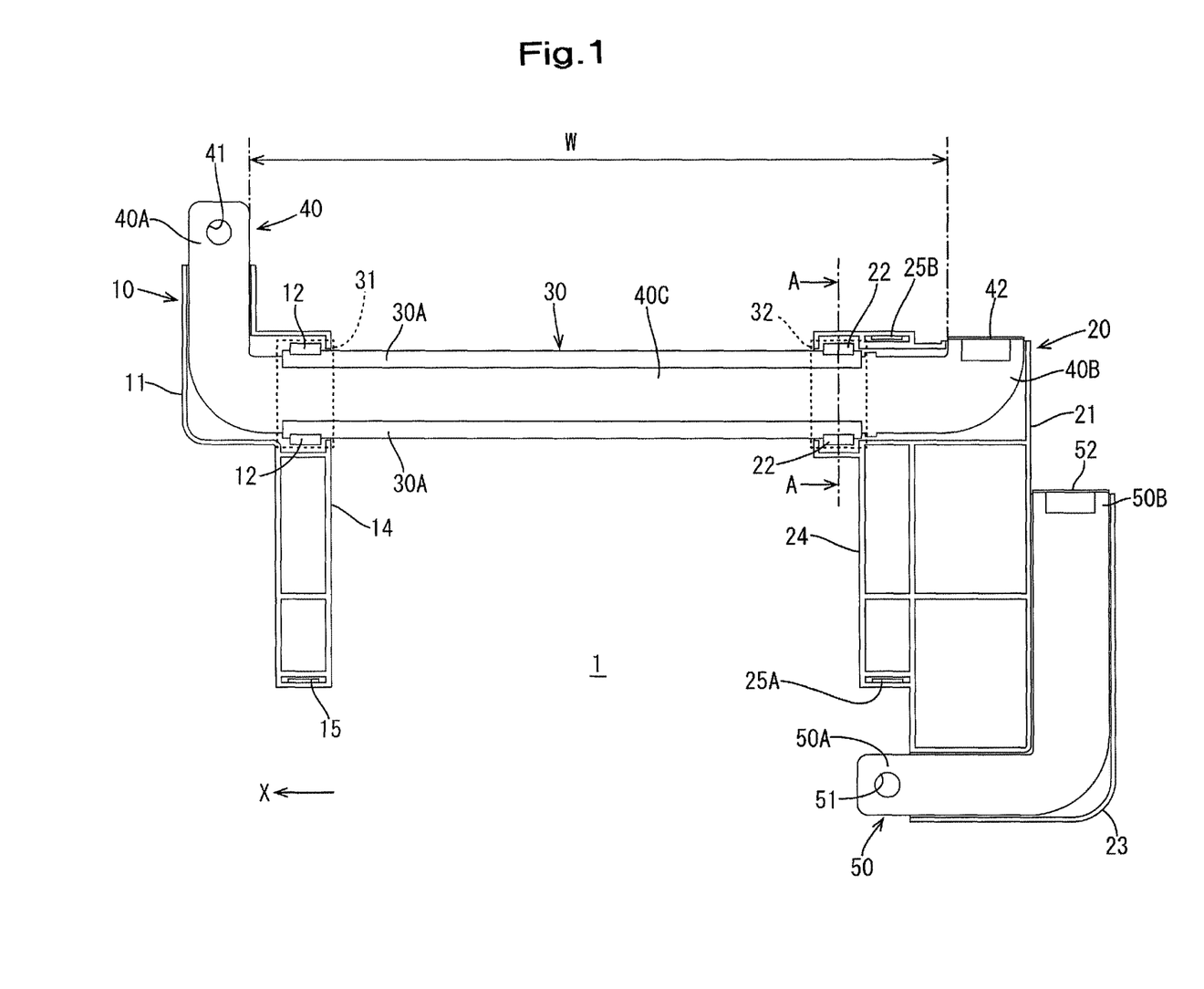
FIG. 1 is a plan view of an external connection bus bar holding structure of an embodiment.
Figure 2:
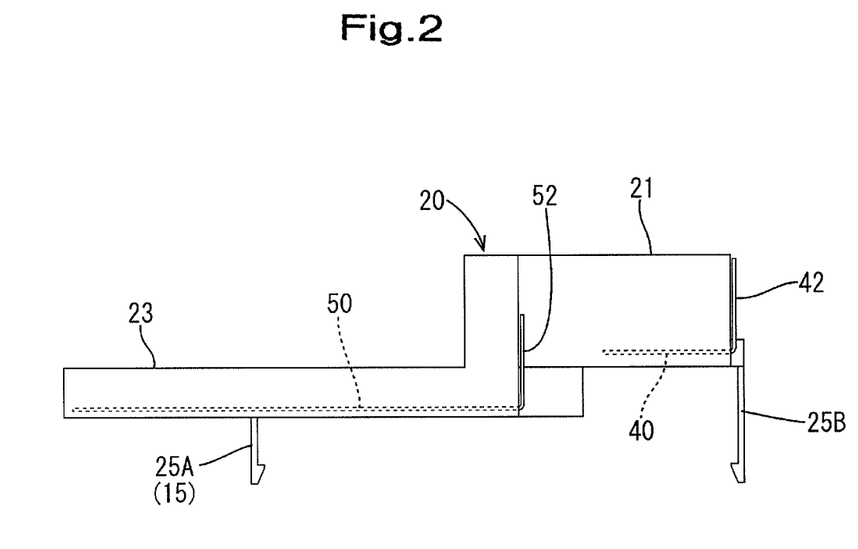
FIG. 2 is a side view of an external connection bus bar holding structure.

The anode external connection bus bar 40 has a flat plate shape (see FIG. 3). Specifically, as shown in FIG. 1, the anode external connection bus bar 40 includes one end portion 40A that is connected to an anode output terminal OUTN of the power storage element group 60, another end portion 40B is connected to an external device that is supplied with power from the power storage element group, and an intermediate portion 40C that is located between the one end portion 40A and the other end portion 40B. The anode external connection bus bar 40 is an example of an "external connection bus bar". Here, for example, the intermediate portion 40C corresponds to the range indicated by arrow W in FIG. 1, the first end portion 40A corresponds to the portion on the left side with respect to the intermediate portion 40C, and the other end portion 40B corresponds to the portion on the right side with respect to the intermediate portion 40C.

The one end portion 40A is provided with a through hole 41 for connecting the anode external connection bus bar 40 to the cathode output terminal OUTN. Also, the other end portion 40B is provided with a connection terminal portion 42 for connecting the anode external connection bus bar 40 to an external device.

2. Configuration of External Connection Bus Bar Holding Structure

As shown in FIG. 1, the external connection bus bar holding structure 1 includes a first protector 10, a second protector 20, and an intermediate protector 30.

The first protector 10 is made of an insulating member such as synthetic resin, and as shown in FIG. 1, includes a bus bar holding portion 11, first locking portions 12, an extended portion 14, a locking piece 15, and the like.

The bus bar holding portion 11 insulates and holds the one end portion 40A of the anode external connection bus bar 40. Specifically, a portion of the intermediate portion 40C of the anode external connection bus bar 40 is also held via a later-described first held portion 31 of the intermediate protector 30.

As shown in FIG. 1, a pair of the first locking portions 12 are provided in correspondence with the width of the intermediate protector 30 and lock the cathode external connection bus bar 40 via the first held portion 31 of the intermediate protector 30 (see FIG. 3). Note that FIG. 3 shows a cross-section of the second held portion 32 of the later-described second protector 20, but a cross-section of the first held portion 31 of the first protector 10 is also shown since the configurations are the same.

The extended portion 14 is extended in the width direction of the intermediate portion 30C of the cathode external connection bus bar 40 from the bus bar holding portion 11, and the locking piece 15 is formed on the leading end portion of the extended portion 14. The locking piece 15 engages with locking grooves 66 (see FIG. 6) formed on the later-described power storage elements 61, whereby the first protector 10, or in other words, the external connection bus bar holding structure 1 is coupled to the power storage element group 60.

The second protector 20 is made of an insulating member such as synthetic resin, similarly to the first protector 10, and as shown in FIG. 1, includes a first bus bar holding portion 21, second locking portions 22, a second bus bar holding portion 23, an extended portion 24, two locking pieces 25A and 25B, and the like. As shown in FIG. 1, the second protector 20 is arranged at a predetermined interval from the first protector 10.

The first bus bar holding portion 21 insulates and holds the other end portion 40B of the anode external connection bus bar 40. Specifically, a portion of the intermediate portion 40C of the anode external connection bus bar 40 is also held via a later-described second held portion 32 of the intermediate protector 30.

As shown in FIG. 1, a pair of the second locking portions 22 are provided in correspondence with the width of the intermediate protector 30 and lock the anode external connection bus bar 40 via the second held portion 32 of the intermediate protector 30 (see FIG. 3). Note that the shapes of the first locking portions 12 and the second locking portions 22 are not limited to the hook-type shapes with tapered cross-sections shown in FIG. 3.

A second bus bar holding portion 23 holds a cathode external connection bus bar 50. As shown in FIG. 1, the cathode external connection bus bar 50 includes one end portion 50A that is connected to a cathode output terminal OUTP of the power storage element group 60, and another end portion 50B that is connected to the external device that is supplied with power from the power storage element group 60. The one end portion 50A is provided with a through hole 51 for connecting the cathode external connection bus bar 50 to the cathode output terminal OUTP. Also, the other end portion 50B is provided with a connection terminal portion 52 for connecting the cathode external connection bus bar 50 to an external device.

The extended portion 24 is extended in the width direction of the intermediate portion 30C of the anode external connection bus bar 40 from the first bus bar holding portion 21, and the locking pieces 25A and 25B are formed on both end portions of the extended portion 24. The locking pieces 25A and 25B are engaged with the locking grooves 66 (see FIG. 6) formed on the later-described power storage elements 61, whereby the second protector 20, or in other words, the external connection bus bar holding structure 1 is coupled to the power storage element group 60.

The intermediate protector 30 is made of synthetic resin that elastically deforms, and for example, is formed through extrusion molding. The intermediate protector 30 has a shape that covers a lower surface 40R, both side surfaces 40S extending in the lengthwise direction (i.e., both side portions 40S in the width direction (the direction indicated by arrow Y in FIG. 3), and both end portions 40E extending in the lengthwise direction of the upper surface 40U (i.e., both end portions 40E in the width direction of the upper surface 40U) of the anode external connection bus bar 40 (see FIG. 3).

As indicated surrounded by the broken line in FIG. 1, the intermediate protector 30 includes the first held portion 31 held in the first protector 10 and the second held portion 32 held in the second protector 20. As shown in FIG. 3, in the second held portion 32, the end portions 30A of the intermediate protector 30 covering the upper surface 40U of the anode external connection bus bar 40 are locked by the second locking portions 22 of the second protector 20.

Specifically, the end portions 30A of the intermediate protector 30 are inserted into the spaces between the bottom portion and the second locking portions 22 of the second protector 20, whereby the intermediate protector 30 is locked by the second locking portions 22. Accordingly, the anode external connection bus bar 40 is locked by the second protector 20. Note that the locking configuration of the intermediate protector 30 and the second protector 20 at the second held portion 32 is a locking configuration that is similar for the intermediate protector 30 and the first protector 10 at the first held portion 31 as well, although this is not illustrated.

The intermediate protector 30 holds the anode external connection bus bar 40 at the first held portion 31 and the second held portion 32, and between the first protector 10 and the second protector 20. That is, the anode external connection bus bar 40 is held overlapping with the first protector 10 at the first held portion 31 and overlapping with the second protector 20 at the second held portion 32.

3. Configuration of Power Storage Module.

Figure 5:
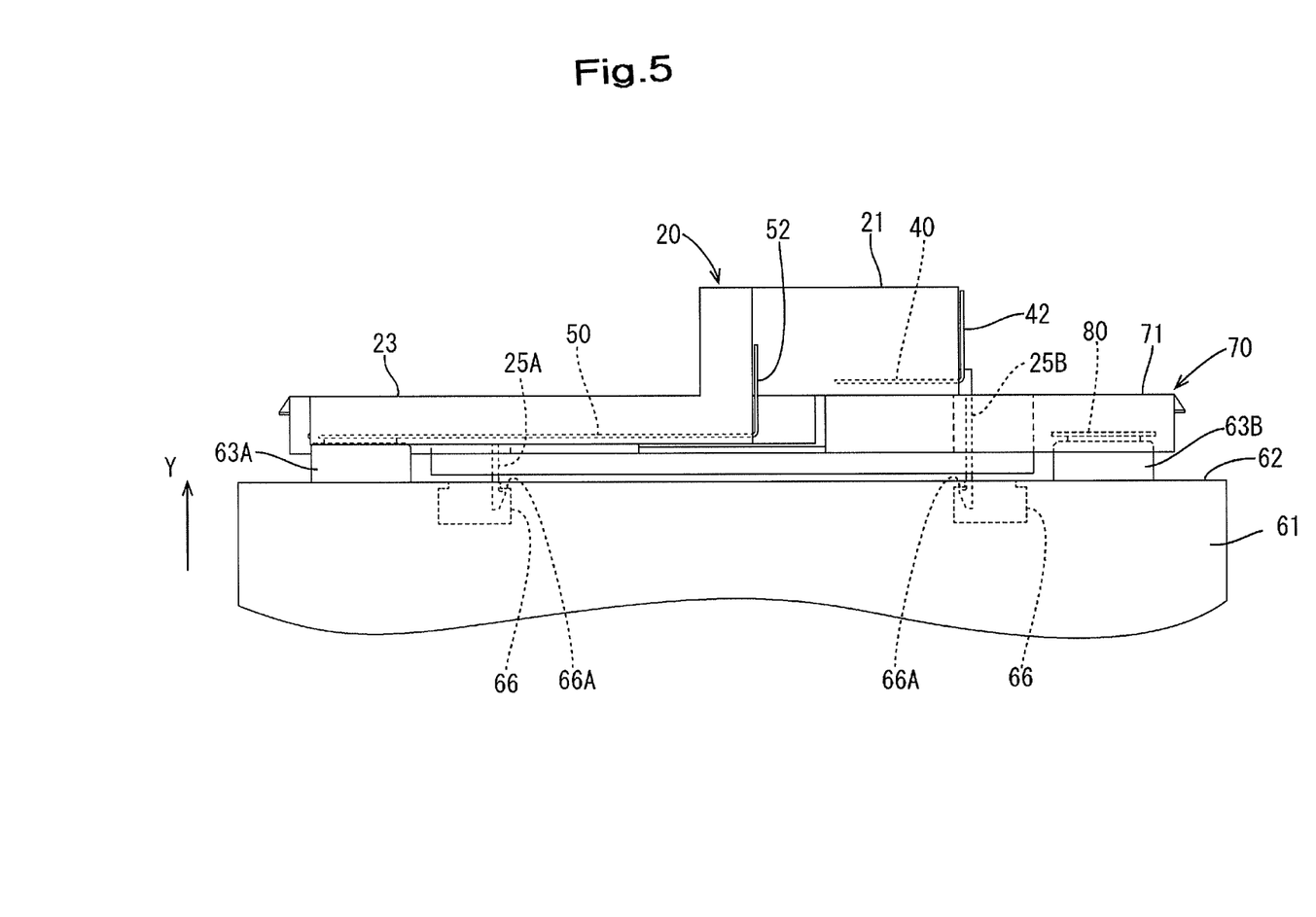
FIG. 5 is a side view of a power storage module.

As shown in FIGS. 4 and 5, the power storage module 100 of the present embodiment is largely constituted by the power storage element group 60 constituted by aligning multiple power storage elements 61 side by side (see FIG. 6), a battery connection module 70 (see FIG. 7) attached to the power storage element group 60, and the above-described external connection bus bar holding structure 1. Hereinafter, the power storage element group 60 and the battery connection module 70 will be described simply.

3-1. Power Storage Element Group and Power Storage Element

Figure 6:
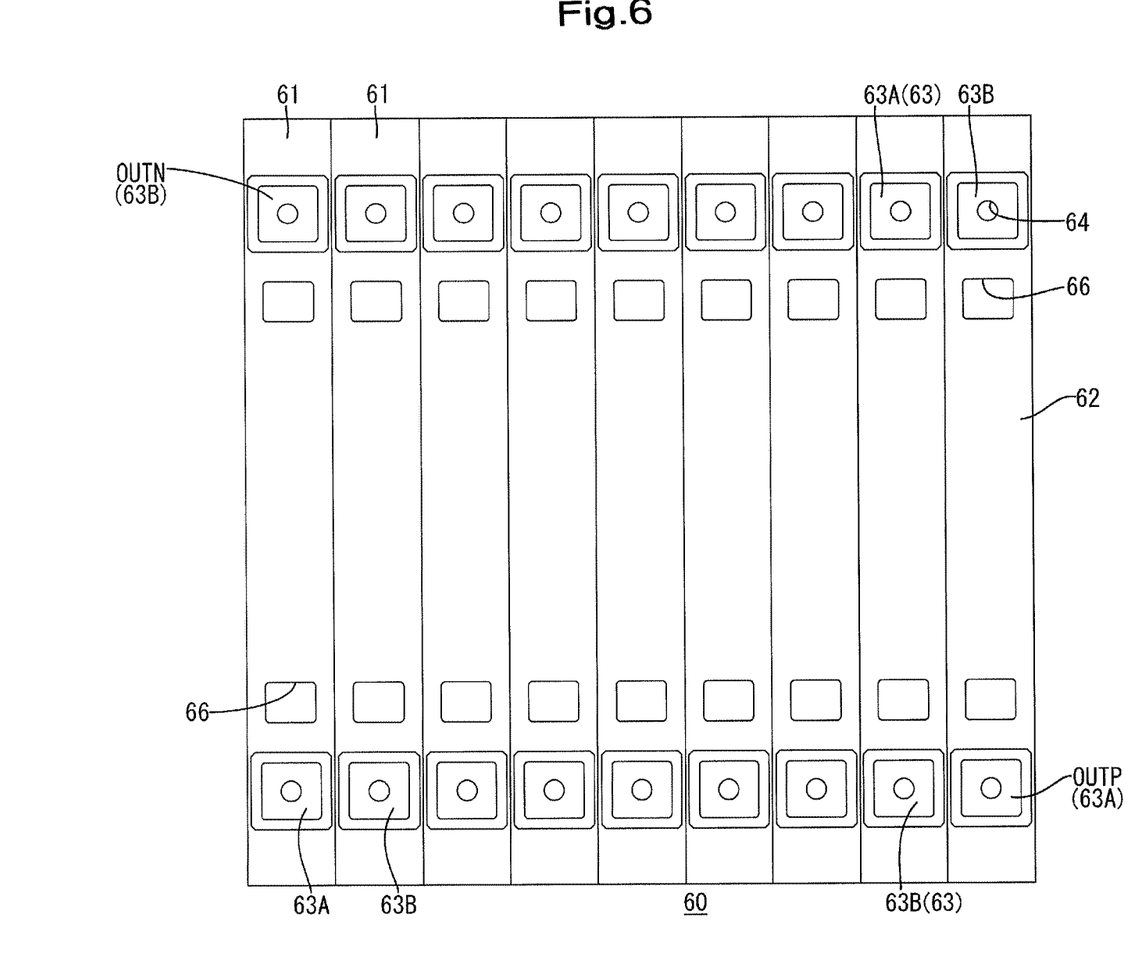
FIG. 6 is a plan view of a power storage element group.

The power storage elements 61 of the present embodiment are secondary batteries, for example. As shown in FIG. 6, the multiple power storage elements 61 are aligned in one row to form the power storage element group 60.

The power storage elements 61 have flat cuboid-shaped outer shapes, and as shown in FIG. 6, have perpendicular electrode arrangement surfaces 62 that are perpendicular to the surfaces opposing the adjacent power storage elements 61. A pair of power storage elements 63 are arranged at positions near both end portions in the lengthwise direction on the electrode arrangement surface 62. One of the electrode terminals 63 is a cathode terminal 63A and the other is an anode terminal 63B. The electrode terminals 63 are made of metal and protrude in the form of rectangular tubes from the electrode arrangement surface 62 (see FIG. 5). Each electrode terminal 63 is provided with a screw hole 64 to which a bolt 82 (see FIG. 4) is coupled.

On the electrode arrangement surface 62 of each power storage element 61, locking grooves 66 with which the locking piece 15 of the first protector 10 and the locking pieces 25A and 25B of the second protector 20 are engaged are provided near the pair of electrode terminals 63. The locking grooves 66 have rectangular openings and have a form that is recessed in a recessed shape from the electrode arrangement surface 62 (see FIGS. 5 and 6). The locking grooves 66 include locking portions 66A that lock the locking pieces 15, 25A, and 25B. Due to the locking pieces 15, 25A, and 25B being locked by the locking portions 66A, the external connection bus bar holding structure 1 is attached to the upper portion of the power storage element group 60.

The multiple power storage elements 61 are aligned such that electrode terminals 63 with different polarities are adjacent to each other on two adjacent power storage elements 61 (i.e., such that a cathode terminal 63A of one power storage element 61 and an anode terminal 63B of another power storage element 61 adjacent thereto are adjacent to each other). Also, as shown in FIG. 6, in the present embodiment, the anode terminal 63B of the power storage element 61 on the left end is the anode output terminal OUTN and the cathode terminal 63A of the power storage element 61 on the right end is the cathode output terminal OUTP.

3-2. Battery Connection Module.

Figure 7:
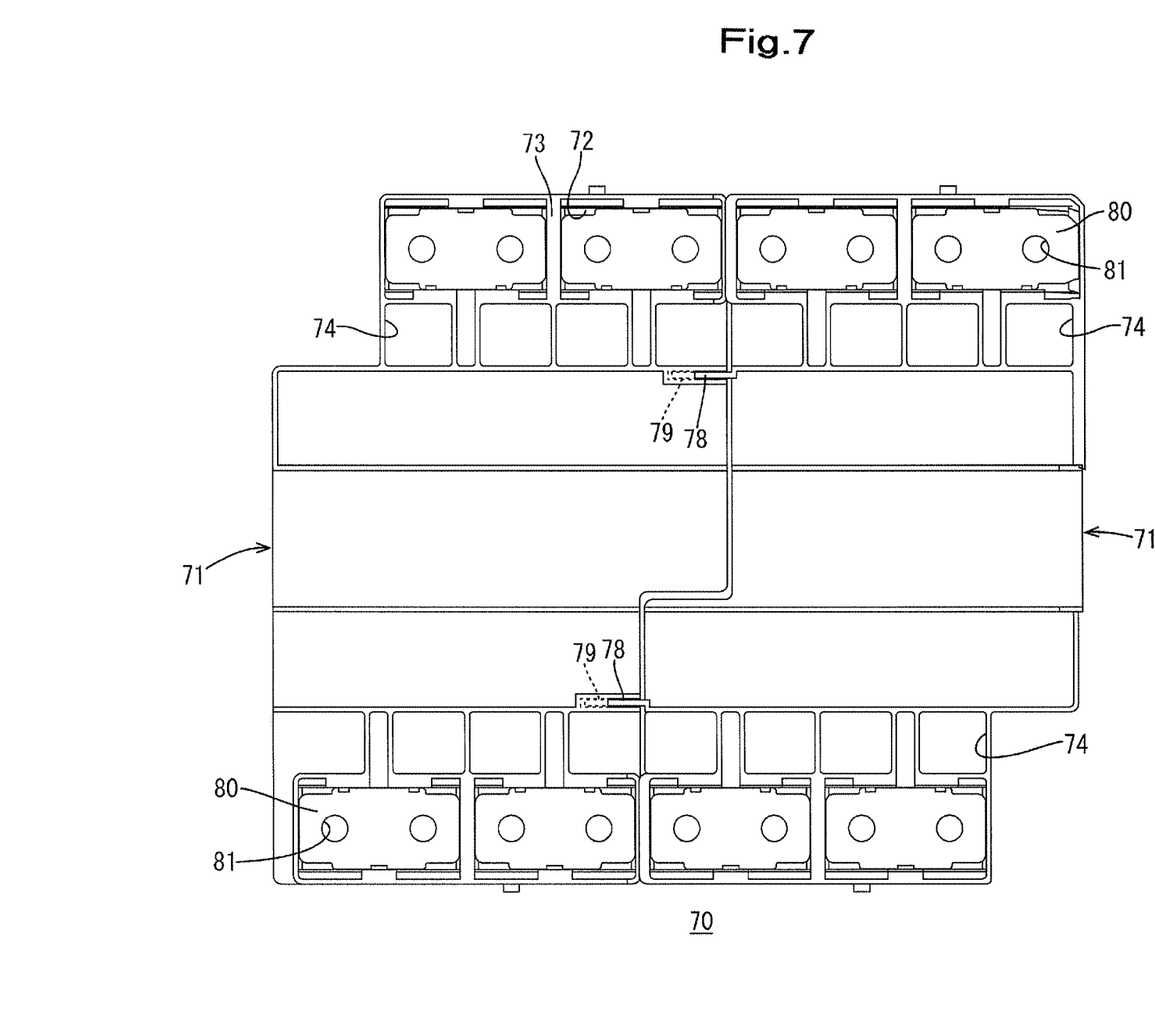
FIG. 7 is a plan view of a battery connection module.

The battery connection module 70 is a member that is attached to the surface constituted by the electrode arrangement surfaces 62 of the power storage elements 61 in the power storage element group 60. As shown in FIG. 7, the battery connection module 70 includes two insulating protectors 71, bus bars 80 that are held in the insulating protectors 71 and connect the adjacent cathode terminals 63A and anode terminals 63B of the power storage elements 61, voltage detection terminals (not shown) that are arranged overlaid on the bus bars 80 and are electrically connected thereto, detection wires (not shown) that are connected to the voltage detection terminals, and the like.

The bus bars 80 are formed by punching out metal plates, and as shown in FIG. 7, they are plate-shaped members with approximately rectangular shapes overall, the four corners of which are cut out into flat rectangular shapes. Each bus bar 80 is provided with two connection holes 81 for coupling bolts 82 (see FIG. 4) to the screw holes 64 of the power storage elements 61. Examples of the material of the bus bars 80 include copper, copper alloys, aluminum, aluminum alloys, and stainless steel (SUS).

In the present embodiment, two insulating protectors 71 are aligned in the alignment direction of the multiple power storage elements 61. The insulating protectors 71 are constituted by an insulating member such as synthetic resin. As shown in FIG. 7, each insulating protector 71 includes a pair of bus bar holding portions 72 that are open in the vertical direction and contain and hold the bus bars 80, opening portions 74 for engaging the locking pieces 15, 25A, and 25B of the external connection bus bar holding structure 1 with the locking grooves 66 of the power storage elements 61.

The bus bar holding portions 72 include rectangular tube-shaped containing walls 73 inside of which the bus bars 80 are held in a state of being insulated from adjacent bus bars 80, and the containing walls 73 also function as protection walls for the adjacent electrode terminals 63. Also, each insulating protector 71 is provided with engagement portions 78 and engagement receiving portions 79 for coupling with an adjacent insulating protector 71.

4. Method for Assembling Power Storage Module.

When the power storage module 100 of the above-described present embodiment is assembled, first, two insulating protectors 71 are coupled to each other through the engagement portions 78 and the engagement receiving portions 79. Next, the bus bars 80 are contained in the bus bar holding portions 72 of the insulating protectors 71.

Figure 8:
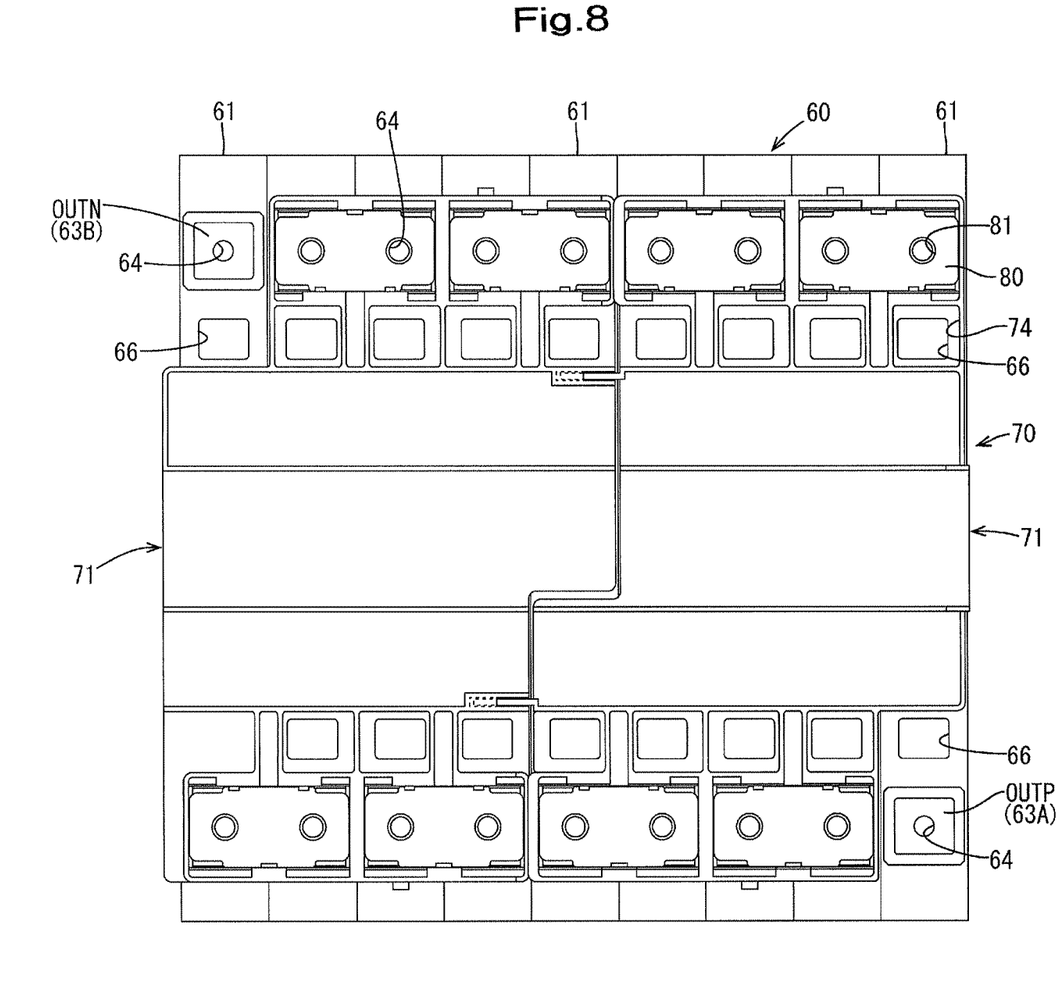
FIG. 8 is a plan view showing a state in which a battery connection module is placed on a power storage element group.

The thus-assembled battery connection module 70 is placed on the electrode arrangement surface 62 of the power storage element group 60. This state is shown in FIG. 8. Next, the bolt 82 is engaged with the screw hole 64 of the power storage element 61 via the connection hole 81 of the bus bar 80. Accordingly, the cathode terminals 63A and the anode terminals 63B of the adjacent power storage elements 61 are connected and the battery connection module 70 is attached to the power storage element group 60.

Next, the external connection bus bar holding structure 1 to which the anode external connection bus bar 40 and the cathode external connection bus bar 50 are attached is attached to the power storage element group 60 from above the battery connection module 70. At this time, the locking pieces 15, 25A, and 25B of the external connection bus bar holding structure 1 are engaged with the locking grooves 66 of the power storage elements 61 via the opening portions 74 of the battery connection module 70.

Note that the intermediate protector 30 is attached to the intermediate portion 40C of the anode external connection bus bar 40 before the anode external connection bus bar 40 is attached to the external connection bus bar holding structure 1. That is, when the anode external connection bus bar 40 is attached to the external connection bus bar holding structure 1, the first held portion 31 of the intermediate protector 30 is held in the first protector 10 and the second held portion 32 is held in the second protector 20. For this reason, the intermediate portion 40C of the anode external connection bus bar 40 does not come into direct contact with the first locking portion 12 of the first protector 10 and the second locking portion 22 of the second protector 20.

Also, a bolt 82 is engaged with the screw hole 64 of the anode output terminal OUTN of the power storage element group 60 via the through hole 41 of the anode external connection bus bar 40 and a bolt 82 is engaged with the screw hole 64 of the cathode output terminal OUTP of the power storage element group 60 via the through hole 51 of the cathode external connection bus bar 50. Accordingly, the external connection bus bar holding structure 1, the anode external connection bus bar 40, and the cathode external connection bus bar 50 are attached to the power storage element group 60 from above the battery connection module 70. Thus, the power storage module 100 shown in FIG. 4 is completed.

5. Effect of the Present Embodiment

In the present embodiment, the first protector 10, the second protector 20, and the intermediate protector 30 that includes the first held portion 31 that is held overlapping with the first protector 10 and the second held portion 32 that is held overlapping with the second protector 20 are provided as protectors that hold the anode external connection bus bar (external connection bus bar) 40. For this reason, even if it is necessary to dispose the anode external connection bus bar 40 over a long distance between both ends of the power storage element group 60, the anode external connection bus bar 40 can be held easily and stably.

Also, the thin plate-shaped anode external connection bus bar 40 can be held in the first protector 10 and the second protector 20 in a state of being held in the intermediate protector 30. For this reason, deformation of the anode external connection bus bar 40 can be suppressed and the anode external connection bus bar 40 can be attached to the first protector 10 and the second protector 20. Furthermore, at the first held portion 31 and the second held portion 32, which are coupling portions for multiple protectors, the anode external connection bus bar 40 is held by the first held portion 31 and the second held portion 32, and therefore it is possible to suppress a case in which the anode external connection bus bar 40 deforms. For this reason, according to the external connection bus bar holding structure 1 of the present embodiment, the anode external connection bus bar 40 that is disposed over a long distance can be held stably with a simple configuration.

Also, the anode external connection bus bar 40 can be held more stably with the configuration of holding such that almost the entirety of the anode external connection bus bar 40 is covered expect for part of the upper surface, and the configurations of the first locking portions 12 and the second locking portions 22, in the intermediate protector 30.

Also, since the intermediate protector 30 is constituted by synthetic resin that deforms elastically, the task of attaching the anode external connection bus bar 40 to the intermediate protector 30 can be simplified.

Other Embodiments

The technique disclosed in the present specification is not limited to the embodiment described by means of the description above and the drawings, and for example, the following embodiments are also encompassed in the technical scope.

Figure 9:
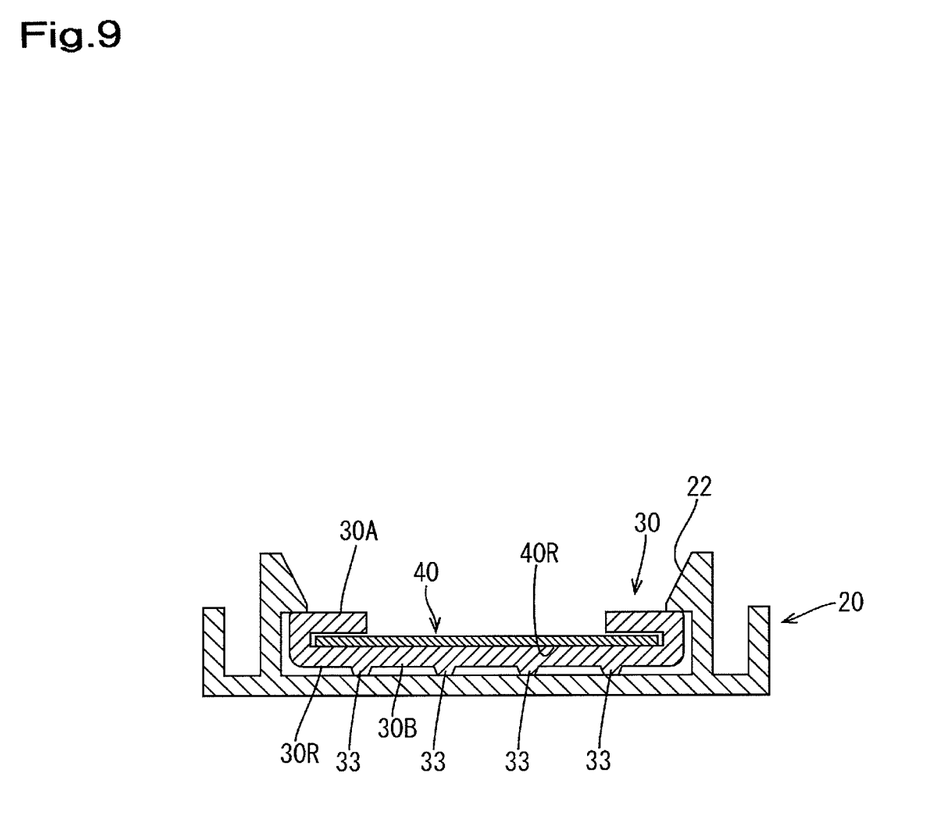
FIG. 9 is a cross-sectional view showing another mode of an intermediate protector.

(1) The cross-sectional shape of the intermediate protector 30 is not limited to that shown in FIG. 3. For example, as shown in FIG. 9, a surface 30R of the bottom surface 30B of the intermediate protector, which is opposite to the surface in contact with the lower surface 40R of the anode external connection bus bar 40 may be provided with at least two (an example of four is shown in FIG. 9) protrusions 33 that extend in the lengthwise direction (direction of arrow X in FIG. 1) of the intermediate protector 30. In this case, the rigidity of the intermediate protector 30 can be increased through the configuration of the protrusion 33. Accordingly, the anode external connection bus bar 40 can be held more stably.

Figure 10:
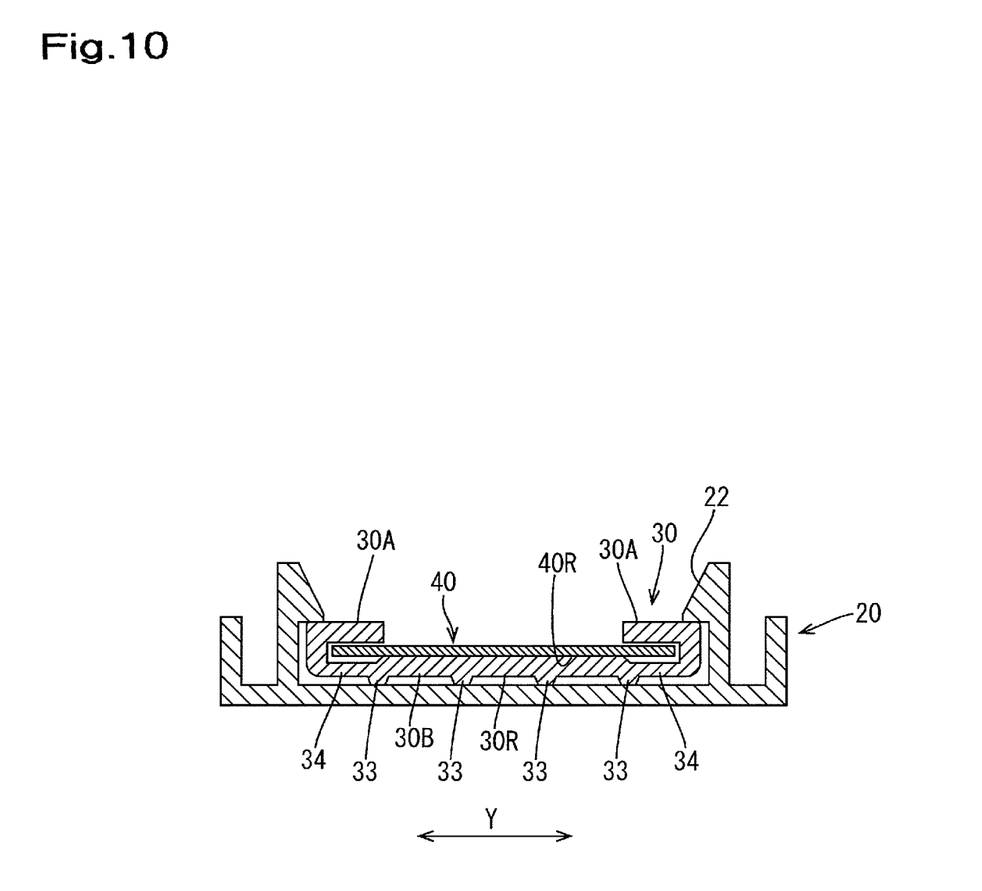
FIG. 10 is a cross-sectional view showing another mode of an intermediate protector.

Also, as shown in FIG. 10, both end portions in the width direction (direction of arrow Y in FIG. 10) on the bottom portion 30B of the intermediate protector 30 may be further formed into thin portions 34 that do not come into contact with the lower surface 40R of the external connection bus bar. In this case, even if the material of the intermediate protector 30 is a hard synthetic resin material, the intermediate protector 30 is more likely to deform due to the thin portions 34. Accordingly, the task of attaching the anode external connection bus bar 40 to the intermediate protector 30 can be simplified. Note that the protrusions 33 may be omitted in the configuration of the intermediate protector 30 shown in FIG. 10.

(2) The planar shape of the intermediate protector 30 is not limited to that shown in FIG. 1 and the like, that is, it is not limited to a linear shape that extends in the arrangement direction of the power storage elements 61 (direction of arrow X in FIG. 1). The planar shape of the intermediate protector 30 may be changed as appropriate in correspondence to the planar shape of the intermediate portion 40C of the anode external connection bus bar 40. For example, if the intermediate portion 40C of the anode external connection bus bar 40 has a planar shape with a bend in it, the planar shape of the intermediate protector 30 may also accordingly have a planar shape with a bend in it.

(3) In the above-described embodiment, a configuration was used in which the first protector 10 has the first locking portion 12 and the second protector 20 has the second locking portion 22, but there is no limitation to this, and the first locking portion 12 and the second locking portion 22 may be omitted.

(4) In the above-described embodiment, a configuration was used in which the intermediate protector 30 is synthetic resin that elastically deforms, but there is not necessarily a limitation thereto, and the intermediate protector 30 may be synthetic resin that does not elastically deform.

(5) In the above-described embodiment, a configuration was used in which the second protector 20 includes the second bus bar holding portion 23 that holds the cathode external connection bus bar 50, but there is no limitation to this, and the second protector 20 need not include the second bus bar holding portion 23.

Also, an example was shown in which the anode external connection bus bar 40 connected to the anode output terminal OUTN is used as the external connection bus bar, but the cathode external connection bus bar 50 connected to the cathode output terminal OUTP may be used as the external connection bus bar.

LIST OF REFERENCE NUMERALS

1 External connection bus bar holding structure
10 First protector
12 First locking portion
20 Second protector
22 Second locking portion
30 Intermediate protector
31 First locked portion
32 Second locked portion
33 Protrusion
34 Thin portion
40 Anode external connection bus bar (external connection bus bar)
40A One end portion of external connection bus bar
40B Other end portion of external connection bus bar
60 Power storage element group
61 Power storage element
OUTN Anode output terminal (output electrode terminal)
OUTP Cathode output terminal

What is claimed is:

1. An external connection bus bar holding structure for an external connection bus bar to be connected to a power storage element group that includes a plurality of power storage elements and includes a pair of output electrode terminals to output power to an exterior, wherein the external connection bus bar has a thin plate shape and includes one end configured to be connected to at least one of the pair of output electrode terminals and another end configured to be connected to an external device, and the external connection bus bar holding structure comprises:
   a first protector that holds the one end of the external connection bus bar;
   a second protector that is arranged at an interval from the first protector and holds the other end of the external connection bus bar; and
   an intermediate protector including a first held structure that is held in the first protector and a second held structure that is held in the second protector, the intermediate protector holding the external connection bus bar at the first held structure and the second held structure and between the first protector and the second protector, and ends of the intermediate protector that extend along a lengthwise direction of the external connection bus bar and that face each other are spaced apart from one another in a circumferential direction around a width of the external connection bus bar.

2. The external connection bus bar holding structure according to claim 1, wherein
   the intermediate protector has a shape that covers a lower surface, both side surfaces extending in a lengthwise direction, and both end surfaces of an upper surface extending in the lengthwise direction, of the external connection bus bar,
   the first protector has a first lock that locks the external connection bus bar via the first held structure of the intermediate protector, and
   the second protector has a second lock that locks the external connection bus bar via the second held structure of the intermediate protector.

3. The external connection bus bar holding structure according to claim 2, wherein
   the intermediate protector is made of synthetic resin that elastically deforms.

4. The external connection bus bar holding structure according to claim 3, wherein
   the intermediate protector has a bottom structure with a surface which contacts the lower surface of the external connection bus bar, and
   at least two protrusions that extend in the lengthwise direction of the intermediate protector are formed on a surface of the bottom structure opposite to the surface that contacts the lower surface of the external connection bus bar.

5. The external connection bus bar holding structure according to claim 3, wherein
the intermediate protector has a bottom structure which contacts the lower surface of the external connection bus bar, and
both ends in a width direction of the bottom structure are formed as thin structures that do not contact the lower surface of the external connection bus bar.

6. The external connection bus bar holding structure according to claim 1, wherein the second protector includes a holder that secures a second external connection bus bar.

7. The external connection bus bar holding structure according to claim 6, wherein the external connection bus bar is an anode external connection bus bar, and the second external connection bus bar is a cathode external connection bus bar.

8. The external connection bus bar holding structure according to claim 1, wherein
the intermediate protector is made of synthetic resin that does not elastically deform.

9. An external connection bus bar holding structure for an external connection bus bar to be connected to a power storage element group that includes a plurality of power storage elements and includes a pair of output electrode terminals to output power to an exterior, wherein the external connection bus bar has a thin plate shape and includes one end configured to be connected to at least one of the pair of output electrode terminals and another end configured to be connected to an external device, and the external connection bus bar holding structure comprises:
a first protector that holds the one end of the external connection bus bar;
a second protector that is arranged at an interval from the first protector and holds the other end of the external connection bus bar; and
an intermediate protector including a first held structure that is held in the first protector and a second held structure that is held in the second protector, the intermediate protector holding the external connection bus bar at the first held structure and the second held structure and between the first protector and the second protector, wherein
the intermediate protector has a shape that covers a lower surface, both side surfaces extending in a lengthwise direction, and both end surfaces of an upper surface extending in the lengthwise direction, of the external connection bus bar,
the first protector has a first lock that locks the external connection bus bar via the first held structure of the intermediate protector,
the second protector has a second lock that locks the external connection bus bar via the second held structure of the intermediate protector,
the intermediate protector is made of synthetic resin that elastically deforms,
the intermediate protector has a bottom structure with a surface which contacts the lower surface of the external connection bus bar, and
at least two protrusions that extend in the lengthwise direction of the intermediate protector are formed on a surface of the bottom structure opposite to the surface that contacts the lower surface of the external connection bus bar.

10. An external connection bus bar holding structure for an external connection bus bar to be connected to a power storage element group that includes a plurality of power storage elements and includes a pair of output electrode terminals to output power to an exterior, wherein the external connection bus bar has a thin plate shape and includes one end configured to be connected to at least one of the pair of output electrode terminals and another end configured to be connected to an external device, and the external connection bus bar holding structure comprises:
a first protector that holds the one end of the external connection bus bar;
a second protector that is arranged at an interval from the first protector and holds the other end of the external connection bus bar; and
an intermediate protector including a first held structure that is held in the first protector and a second held structure that is held in the second protector, the intermediate protector holding the external connection bus bar at the first held structure and the second held structure and between the first protector and the second protector, wherein
the intermediate protector has a shape that covers a lower surface, both side surfaces extending in a lengthwise direction, and both end surfaces of an upper surface extending in the lengthwise direction, of the external connection bus bar,
the first protector has a first lock that locks the external connection bus bar via the first held structure of the intermediate protector,
the second protector has a second lock that locks the external connection bus bar via the second held structure of the intermediate protector,
the intermediate protector is made of synthetic resin that elastically deforms,
the intermediate protector has a bottom structure which contacts the lower surface of the external connection bus bar, and
both ends in a width direction of the bottom structure are formed as thin structures that do not contact the lower surface of the external connection bus bar.

* * * * *